United States Patent [19]

Kenyon

[11] Patent Number: 4,617,863

[45] Date of Patent: Oct. 21, 1986

[54] PLATE AND DIAPHRAGM ASSEMBLY FOR A FILTER PRESS

[76] Inventor: Jack Kenyon, The Well, Mill Lane, Goostrey, Cheshire, United Kingdom, CW4 8PN

[21] Appl. No.: 594,198

[22] Filed: Mar. 28, 1984

Related U.S. Application Data

[63] Continuation of Ser. No. 439,025, Nov. 4, 1982, abandoned.

[30] Foreign Application Priority Data

Nov. 7, 1981 [GB] United Kingdom ............... 8133646

[51] Int. Cl.$^4$ ............................................. B01D 25/12
[52] U.S. Cl. .................................. 100/194; 100/211; 210/227; 210/228
[58] Field of Search ............... 210/224, 225, 226, 227, 210/228, 229, 230, 231, 232; 100/198, 211, 218, 194

[56] References Cited

U.S. PATENT DOCUMENTS 3,390,772  7/1968  Juhasz ............................ 210/225 X
3,656,622  4/1972  Heimbach et al. ................. 210/231

FOREIGN PATENT DOCUMENTS 1486816  7/1969  Fed. Rep. of Germany ...... 210/227

Primary Examiner—David Sadowski
Attorney, Agent, or Firm—Fleit, Jacobson, Cohn & Price

[57] ABSTRACT

A filter plate and diaphragm assembly (10) is disclosed for use in a filter press comprising a horizontal stack of such assemblies interleaved with recess plates (12). Each assembly (10) comprises a plate (11) and a diaphragm (19). Plate (11) has a thicker peripheral portion (13) and stay bosses (20). Adjacent portion (13) and staybosses (20) the diaphragm does not overlie the plate (11) but has lips (23, 24) accommodated in recesses (25, 26) in the plate (10). This ensures that the clamping loads applied to the stack are not borne by the diaphragms. The diaphragm 19 can have a drainage channel (28) formed in a rib (29) to receive liquid passing along drainage grooves (27) or the like after passing through a filter cloth (17). Air can be introduced via bores (22) to urge the diaphragm (19) away from the plate (11) to compress a filter cake being formed in the space between the assembly 10 and an adjacent recess plate (12).

15 Claims, 11 Drawing Figures

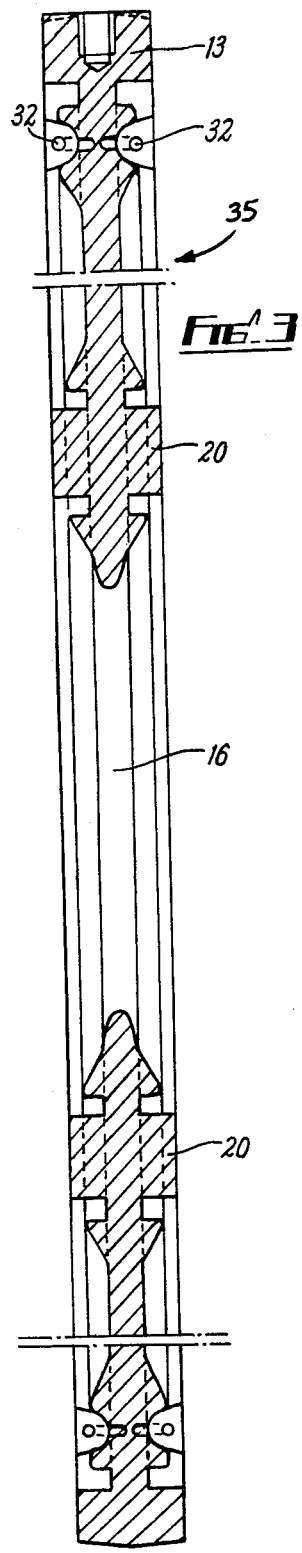
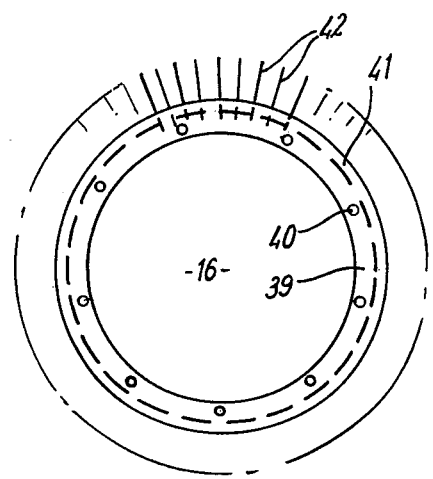
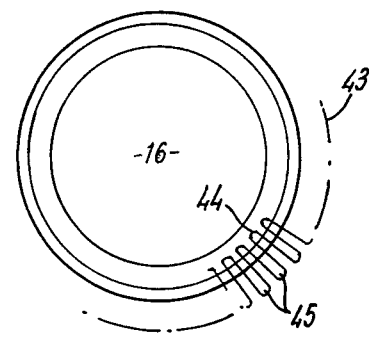

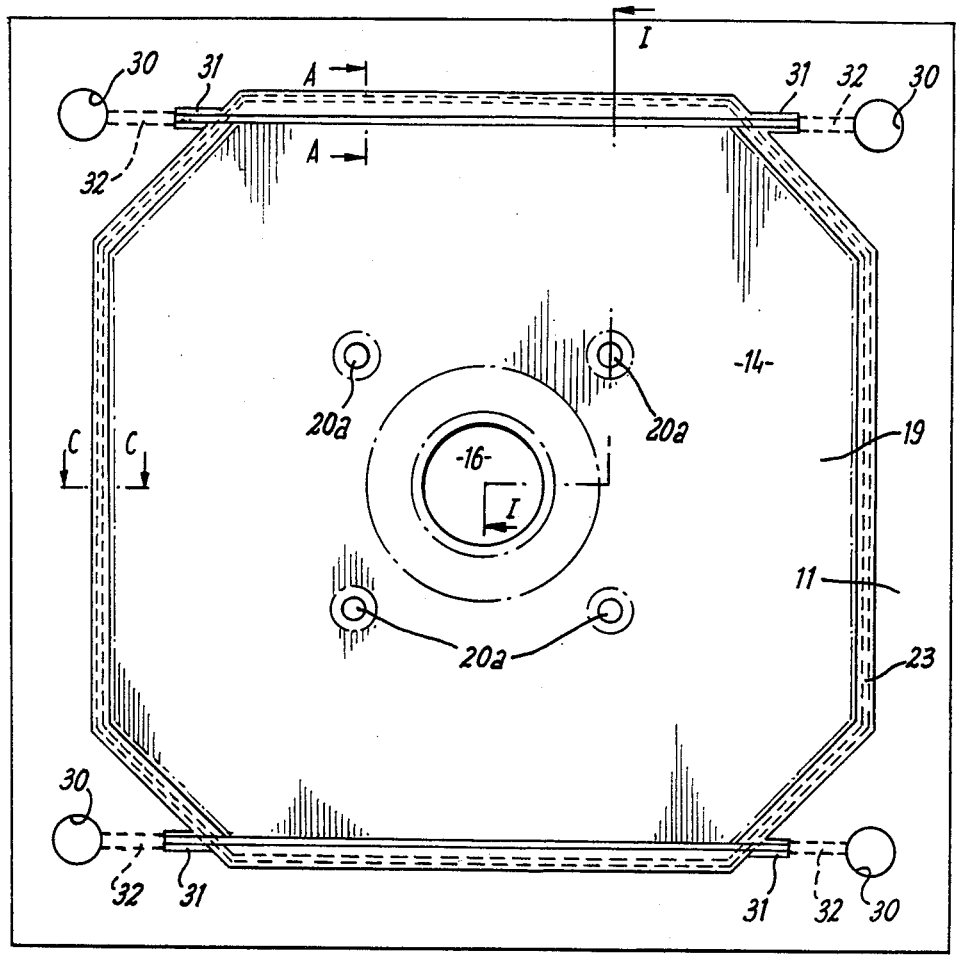
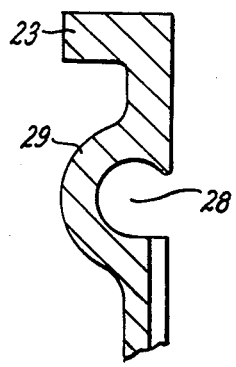
FIG. 5 (A-A)
FIG. 6 (C-C)
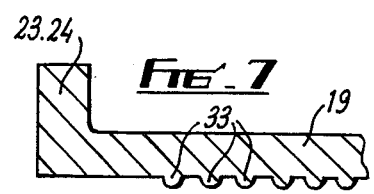
FIG. 7

PLATE AND DIAPHRAGM ASSEMBLY FOR A FILTER PRESS

This is a continuation of application Ser. No. 439,025, filed Nov. 4, 1982, now abandoned.

This invention relates to a filter press of the type (hereinafter referred to as "of the type described") comprising a plurality of plates clamped in face to face relationship with intervening filter cloths and defining between each pair of plates a filter cavity in which a cake can be built up by pumping in a slurry via apertures in the plates, each plate having between the or each operative surface thereof and an adjacent one of the filter cloths a flexible liquid-impermeable diaphragm which can b expanded away from the plate by fluid pressure to compress a cake in a filter cavity. Such a filter press allows a filter cake of high dry solids content to be formed in considerably less time than merely by continued pumping of the slurry into the press.

Difficulties have arisen, however, due to the construction of the plates and the diaphragms, particularly in relation to plates which have stay bosses. At the stay-bosses the diaphragms may be subject to the stresses of press clamping and/or out-of-balance pressures and can be damaged, even when reinforced at these positions. Further, when a diaphragm is damaged, current designs require that the whole plate/diaphragm assembly be removed and returned to the manufacturer for the replacement of the diaphragm which makes the cost of such repair high and necessitates a relitively high stock cost in keeping whole plate/diaphragm assemblies in reserve for replacement of assemblies whose diaphragms are damaged. It is an object of the present invention to reduce or obviate these difficulties and to provide an improved filter press.

According to a first feature of the invention there is provided a filter plate/diaphragm assembly for a filter press of the type described, wherein the filter plate has a peripheral thicker portion and correspondingly thick staybosses between its peripheral thicker portion and a central feed aperture, the diaphragm having lips around its peripheral edge and around its portions which lie in register with the staybosses, which lips are disposed in corresponding recesses in the plate at corresponding locations.

This ensures that when a plurality of the assemblies are clamped in face-to-face relationship the staybosses and flanges make direct contact and the diaphragms are not compressed between adjacent pairs of plates. However, the recesses and lips are so arranged that the clamping of the plates together securely locates the diaphragms and sealingly mounts them relative to the plates.

A plurality of the assemblies can be clamped together with plain recess plates having complementary thicker peripheral portions and staybosses, but without diaphragms. The staybosses on the recess plates can be of greater size than these on the operative plates to overlie the lips of the diaphragm and urge them into sealing engagement with the recesses. Similarly the plain plates can have wider peripheral portions which act in similar manner on the outer lip of the diaphragms.

The shape of the body of the diaphragm can be such that it is relaxed in a position intermediate a first psition where it closely overlies the adjacent surface of its associated plate and a second position, remote from the first position, which it attains when fluid, e.g. air, is pumped into the plate to cause the diaphragm to compress a filter cake in a filter chamber. This has the effect that the diaphragm has to move a reduced distance between its relaxed position and its extreme working conditions thus reducing stress and wear of the diaphragm. The surface of the diaphragm remote from its plate, which surface faces a filter cloth, can be provided with drainage pips and/or drainage grooves to allow the flow of filtrate from the outer surface of the filter cloth.

The shape of the body of the diaphragm can also be such that when relaxed it fills or substantially fills the space adjacent the working surface of the associated plate. In such an instance the filter cake will be built up by pressure of the slurry introduced, the cake as it is built up displacing the diaphragm towards the plate.

According to a second feature of the invention there is provided a filter plate/diaphragm assembly for a filter press of the type described wherein the diaphragm has over at least a portion of its periphery a rim which normally occupies a complementary recess in the plate, the rim being provided with a longitudinal drainage channel which communicates laterally with the working surface of the diaphragm and at one or both ends communicates with a drainage eye in the filter plate. The working surface of the diaphragm, which in use faces a filter cloth, can have drainage pips and/or drainage channels formed therein and communicating with the drainage channel in the rim can be by grooves or the like formations.

Communication between the longitudinal drainage channel in the rim and the drainage eye can be by a passage in one end of the rim portion which communicates with a corresponding passage in the plate which leads to the drainage eye.

At its ends the rim can extend outwardly from the diaphragm and be accommodated in extensions of the recess in the plate. To discourage air pressure from displacing this portion and escaping to the drainage eye, these portions of the diaphragm can be of substantial strength and reinforced by a central tubular metal liner defining part of the duct from the drainage channel to the drainage eye.

When the diaphragm is of the kind mentioned in accordance with the first feature, the rim portion having the longitudinal drainage channel can be part of the locating rim of the diaphragm.

According to a third feature of the invention there is provided a filter plate/diaphragm assembly, for a filter press of the type described, wherein a diaphragm is provided on one side of the plate, the diaphragm being sealing united at a feed aperture of the plate by a clamp securing it to the plate or to a similar diaphragm on the remote face of the plate.

The diaphragms can be reinforced adjacent the feed aperture. The reinforcement can be in the form of ligaments, such as wires, threads or the like extending away from the feed aperture and embedded in the body of the diaphragm. As an alternative, the reinforcement can be in the form of a laminar member having an annular body surrounding the feed aperture and fingers extending outwardly from the body. The laminar member can be a metal plate or a similar flexible, non extensible member. The reinforcement should extend outwardly from the periphery of the clamp for a distance at least equal to the plate separation.

The clamping can comprise a pair of annular clamp halves united by setscrews or similar fasteners. The clamp can be of outwardly open channel section, the surface of the clamp halves where they contact the diaphragm or are likely to contact the diaphragm being rounded to reduce the risk of building up local stress in the diaphragm which could cause failure thereof.

This feature allows separate diaphragms to be used, usually, but not essentially one on each side of the plate, thus enabling a smaller unit to be replaced in the event of damage to one diaphragm. This renewal can be carried out on site.

BRIEF DESCRIPTION OF THE DRAWINGS

The invention will be described further, by way of example, with reference to the accompanying drawings, wherein:

FIG. 1a is a fragmentory view showing part of FIG. 1 before clamping of the plates;

FIG. 1b shows a variation.

FIG. 3 is a transverse cross-sectional view (line III—III in FIG. 4) through a plate of the assembly of the invention.

FIG. 4 is a front elevation of a plate/diaphragm of the invention;

FIG. 5 is an enlarged detail of the diaphragm;

FIG. 6 is a further enlarged detail of the diaphragm;

FIG. 7 is a view similar to FIG. 6 but showing a variation;

FIG. 8 is a fragmentary front elevation of the assembly shown in FIG. 2; and

FIG. 9 is a similar view showing a variation.

DESCRIPTION OF THE PREFERRED EMBODIMENTS

Figure 1:
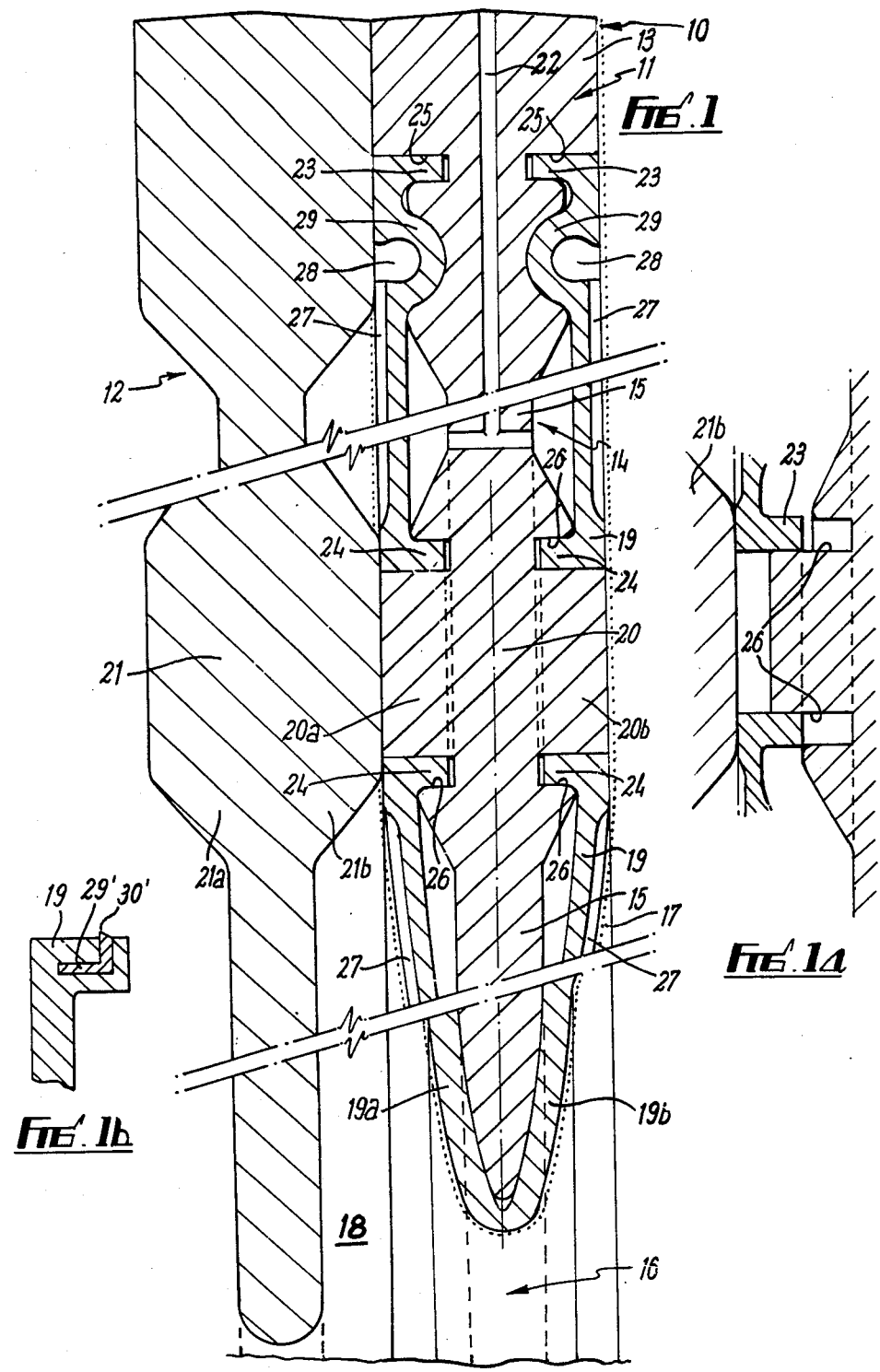
FIG. 1 is a longitudinal cross-sectional view showing a half of a pair of plates in a filter press, one of the plates being part of a filter plate/diaphragm assembly of the invention, the cross-section being taken on line I—I of FIG. 4.

A preferred filter plate/diaphragm assembly 10 of the invention is suitable for use in a filter press of the type described which has a plurality of assemblies 10, each having a filter plate 11, of uniform thickness, arranged in alternation with a plurality of plain recess plates 12 to form a horizontal stack, each filter plate 11 having a peripheral thicker portion 13, surrounding a smoothly curved and rounded hollow 14 defined by a thinner inner portion 15 surrounding a central through-aperture 16 and being substantially enclosed within a diaphragm 19. A filter cloth 17 encloses each assembly 10 and a filter cake can be built up by pumping a slurry via the central through passage to form a cake in each working chamber 18 defined by the hollows in adjacent plates, liquid passing through the filter cloths 17 and travelling along the working surfaces of the diaphragms 19 to drainage eyes 30 (Fig. 4) in, say, the corners of the plates 11, & 12 aligned to form a drainage passage extending longitudinally of the stack.

Each plate 11, 12 is rounded at the central aperture and has between the central aperture and the thicker outer portion a plurality of staybosses 20, 21 composed of a pair of protrusions 20a, 20b, 21a, 21b, extending from the respective plate 11, 12 one on each side thereof and contacting protrusions staybosses of adjacent plates in the stack to steady the plates, and maintain them separate. The protrusions 21a of staybosses 21 of plates 12 are greater in size than those of plates 11 so as to extend outside the peripheries of staybosses 20 for a purpose to be later described.

Each plate 11 has its diaphragm 19 in the form of a first part 19a covering one side thereof and united at the centre with a diaphragm part 19b on the other side to form an envelope about the plate 11 to the inside of which a fluid such as compressed air can be introduced through ports 22 in the plate 11 to "inflate" the envelope and compress a partly-formed filter cake in the chamber between the plate 11 and plate 12 to increase its solids content by expulsion of liquor. Each diaphragm 19 does not overlie the peripheral thicker portion 13 of the plate 11 or the protrusions 20a, 20b of the staybosses 20, but has lips 23,24 at its various edge portions, which lips 23, 24 are accomodated in complementary recesses 25, 26 in the inner periphery of the thicker edge portion and in the peripheries of the protrusions 20a, 20b thus enabling the protrusions 20, 21 and the edge portions 13 of the plates 11 and thereof plates 13 to sandwich only the filter cloths 17 between them, thus reducing compressive stress on the diaphragms 19. Nevertheless, the clamping together of the plates 11, 12 is effective to seal the diaphragms 19 to the plates 11 by urging the lips 23, 24 into engagement with the recesses 25, 26, these items being shaped to facilitate sealing.

The diaphragm 19 has a plurality of grooves 27 in its surface facing the cloth 17, which grooves 27 lead liquid passing through the filter cloth 17 to a drain channel 28 in one of two transverse ribs 29 in the diaphragm 19. Channels 28 can be restrained from closure by one or more solid inserts such as an open spital or spaced tubular members (not shown). Ribs 29 are accommodated in complementary concavities in plate 11.

To encourage sealing between the diaphragm 19 and plate 11 at the lips 23, 24 and recesses 25, 26, the lips can be a force fit in the recesses as shown in FIG. 1a. Here lip 23 is shown being urged towards recess 26 by protrusion 21b during clamping. The lip 23 is wider than recess 26 and is thus compressed upon entry into the recess 26 to ensure a good seal. As a variation the lips 23 or 24 can each have a metallic or similar hard insert such as 29' which presents an outer edge 30' which, on insertion into the recess bites into the wall thereof and resists withdrawal of the diaphragm 19.

The transverse ribs 29 can terminate in extension 31 accommodated in the plate 11, and to prevent pressurized air from travelling between the extensions 31 and the palte 11 the extensions can be reinforced by having a tubular insert therein lining a through passage and aligning with passages 32 in the plate 11 or being accomodated therein. In the latter case the passages 32 can have shoulders to prevent movement of the inserts away from the diaphragms.

As an alternative to drainage grooves 27 (FIG. 6) the diaphragm 19 can have pips 33 which define drainage paths by supporting the cloth 17 clean of the diaphragm 19.

Figure 2:
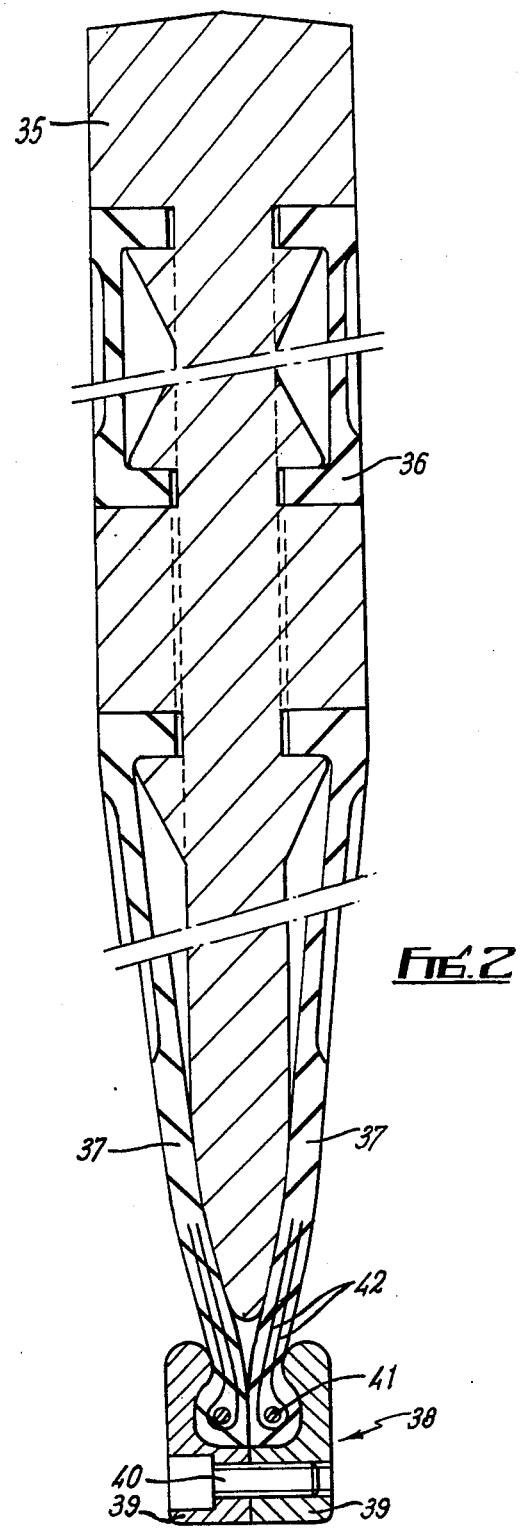
FIG. 2 illustrates a third feature of the invention.

FIG. 2 shows a third feature of the invention, wherein a plate 35 similar in all respects to plate 11 has a diaphragm 36 which is in two complementary parts 37 one on each side of the plate 35.

At the centre of the plate 35, the edge portions of the central apertures in the diaphragms parts 37 are clamped together by an annular two part clamp 38 of outwardly facing C-section, the two halves 39 having rounded edges to reduce stress in the diaphragm parts 37, at this position and being united by setscrews, bolts or like fasteners 40. The edge portions of the diaphragms parts 37 at the centre may be reinforced by having flexible but inextensible members 41, 42 moulded in during manufacture, the reinforcement extending outwardly from the periphery of the clamp for a distance at least equal to the plate separation. These members can take the form of an annular member 41 from which extend radial spokes 42, of metal or textile material as shown in FIG. 8. Alternatively, as shown in FIG. 9, a metal plate 43 can be used having a central annulus 44 and radially outwardly extending fingers 45. The reinforcement tends to prevent ballooning of the diaphragm into the feed channel and bursting thereof when inflated.

The filter plate/diaphragm assembly of the invention has the advantage that if a diaphragm should become damaged it is only necessary to replace a small component and the whole plate does not have to be returned to the manufacturer for repair.

The invention is, of course, applicable to filter presses having plates of different shapes and to presses wherein slurry feed is by an edge or at some position(s) other than a central position.

Other combinations of features are possible within the scope of the invention. For example, the invention can apply where each filter plate has one diaphragm on one side thereof and united with the central aperture in the plate (for example by an arrangement similar to that of FIGS. 2, 8 and 9), the other side of the plate having a plain recess similar to that in plate 12 in FIG. 1. In a filter using such plate 1 diaphragm assemblies all the assemblies would be identical.

As a further variation the lower portions of lips 23, 24 can be of inverted V-shaped in cross-section to enhance sealing. To discourage bursting of the diaphragm adjacent the central feed aperture one or more annular inextensible reinforcing members can be moulded into the rubber or extensible plastics material of the diaphragm. Ligaments of limited extensibility can connect two such annulae or connect one such annulus to an annulus in a central clamp position if provided, to limit diaphragm movement away from the filter plate and into the feed aperture and adjacent space.

I claim:

1. A filter plate and diaphragm assembly for use in a filter press wherein a plurality of plates are disposed in face-to-face relationship and clamped together to form a stack and a clamping force is applied by a clamping means, the stack having a plate structure which includes either a plate structure wherein all of the plates are filter plate and diaphragm assemblies arranged in registry in face-to-face relationship, or a plate structure wherein a first plurality of plates are filter plate and diaphragm assemblies and a second plurality of plates are plain plates without diaphragms, and the filter plate and diaphragm assemblies and the plain plates are arranged alternately in face-to-face relationship and in registry, said filter plate and diaphragm assembly comprising:

a filter plate having a cross section and having a major axis and a minor axis perpendicular to said major axis, the cross section of the plate having a length extending along the major axis and a thickness extending along the minor axis, said plate including a central portion having first and second side faces and which central portion, in use, is in facing relationship with an adjacent plate having first and second side faces and with a filter cake cavity defined between a pair of adjacent plates in a stack of plates, a peripheral portion surrounding said central portion and including a pair of oppositely facing sides which in use are in facing abutting relationship with a peripheral portion of a next-adjacent plate in a stack, and a feed aperture extending from said first side face to said second side face of said central portion to define a flow passage for a slurry which is to be filtered;

a resilient diaphragm which is a sheet of fluid-impervious, resilient material positioned to overlie said central portion of said filter plate between said feed aperture and said peripheral portion on at least one side face of said filter plate, said sheet having an outer periphery and an inner periphery and having an inner surface and an outer surface;

wherein said filter plate has a continuous, inwardly extending recess not extending completely through said thickness of said filter plate at a junction between said peripheral portion and said central portion, said recess having a cross section in the direction of the minor axis of said plate, and wherein said diaphragm has at said outer periphery a lip which extends laterally outwardly from the inner surface of said sheet of resilient material and which when in use extends inward toward the major axis of said filter plate and in a direction substantially parallel to the minor axis of said filter plate, said lip having a cross section corresponding to the cross section of said recess for sealing engagement therewith, said lip extending into said recess to define a continuous seal between said filter plate and said diaphragm, the seal spaced outwardly of said feed aperture in the direction of the major axis of said filter plate and surrounding said feed aperture and spaced inwardly of an outermost edge of said peripheral portion of the filter plate in the direction of the major axis of said filter plate, the outer surface of said sheet adjacent said lip spaced outwardly from said filter plate major axis a distance sufficient to abut a surface carried by a next adjacent plate of said stack; and wherein said lip is maintained in sealing engagement with said recess when in use by a minor fraction of a plate clamping force provided by a plate clamping means, the minor fraction of the clamping force being applied to said lip by a part of a next adjacent plate of said stack, and a major fraction of the clamping force acting to clamp together adjacent plates at peripheral portions of said plates outside the outer periphery of the diaphragm.

2. An assembly as set forth in claim 1 wherein said central portion of said filter plate includes staybosses that extend outwardly of the side faces of said central portion and have a thickness in the direction of the plate minor axis substantially equal to the thickness of said peripheral portion in the direction of the plate minor axis, said staybosses disposed at positions intermediate said feed aperture and said peripheral portion and each surrounded by recesses, said diaphragm having apertures in registry with each of said staybosses, a periphery of each said aperture in said diaphragm including a lip which extends inwardly toward said filter plate transversely of said major axis of said plate and is sealingly received in the recess surrounding the corresponding stayboss.

3. An asssembly as set forth in claim 2 wherein a stack structure comprises alternating a plurality of said filter plate and diaphragm assemblies and a plurality of said plain plates, said plain plates each including a feed aperture substantially aligned with feed apertures in the filter plates and having peripheral portions and staybosses which have a larger area than areas of corresponding ones of portions and staybosses of said filter plates, said plain plate staybosses and peripheral portions positioned to face corresponding ones of said filter plate staybosses and peripheral portions, respectively, to apply said major fraction of said clamping force thereto and to overlie lips of diaphragms at recesses adjacent said peripheral portions of said filter plates and at said recesses adjacent said staybosses to apply said minor fraction of said clamping force to retain said lips on said diaphragms in sealing relationship with said recesses.

4. A filter plate and diaphragm assembly as set forth in claim 1 wherein said filter plate includes a drainage groove in said central portion at a position adjacent said peripheral portion, and said diaphragm includes a drainage channel formed in the outer surface of said diaphragm and a rib formed on the inner surface of said diaphragm opposite said drainage channel, said rib received in said drainage groove, said filter plate including a drainage eye positioned in said peripheral portion outwardly of the outer periphery of said diaphragm, one end of said drainage groove in said plate communicating with said drainage eye.

5. A filter plate and diaphragm assembly as set forth in claim 4 wherein said drainage groove includes an extension that extends outwardly from said central portion into said peripheral portion of said filter plate, said filter plate includes a passage extending from said drainage groove to said drainage eye, and said drainage channel in said diaphragm is in communication with said extension of said drainage groove.

6. A filter plate and diaphragm assembly as set forth in claim 1 wherein said diaphragm includes an aperture in registry with said feed aperture in said filter plate, and clamping means for clamping a peripheral portion of said diaphragm surrounding said diaphragm aperture to the first side face of said plate surrounding said feed aperture and for clamping a second diaphragm on the second side face of said filter plate.

7. An assembly as set forth in claim 1 wherein said lip on said diaphragm and said recess in said filter plate are each defined by spaced parallel side walls, spacing of the side walls of said lip being greater than spacing of the side walls of said recess to compress spacing between the lip side walls upon entry of the lip into and engagement with said recess.

8. A filter plate and diaphragm assembly for a filter press, said assembly comprising:
a filter plate having a cross section and a major plane and including a central portion having first and second side faces and which central portion, in use, is in facing relationship with a filter cake cavity defined between a pair of adjacent plates in a filter press stack, a peripheral portion which surrounds said central portion and which in use is in facing abutting relationship with a peripheral portion of a next-adjacent plate in said stack, and a feed aperture defined by a through-aperture extending from said first side face to said second side face of said central portion to define a flow passage for a slurry which is to be filtered, said filter plate having a continuous inwardly extending recess not extending completely through said plate, said recess having a cross section;

a pair of resilient diaphragms each of which is a sheet of fluid-impervious, resilient material including an outer peripheral portion and an inner peripheral portion and having an inner surface and an outer surface, said inner peripheral portion defining an aperture, said diaphragms each overlying and contacting respective side faces of said central portion and having an area sufficient to cover said central portion of said filter plate between said feed aperture and said peripheral portion at a respective side face of said filter plate, each said diaphragm having at its outer peripheral portion a lip which extends laterally outwardly from the inner surface of said sheet of resilient material, said lip having a cross section corresponding to the cross section of said recess for sealing engagement therewith, each said diaphragm aperture being in registry with said feed aperture in said filter plate, annular clamping means contacting said inner peripheral portions for clamping together said inner peripheral portions of said diaphragms adjacent said feed aperture, said outer surface of each said diaphragm adjacent said lip spaced outwardly from said filter plate major plane a distance sufficient to abut a surface carried by a next adjacent plate of said stack; and
reinforcement means carried by each said diaphragm adjacent said aperture therein, said reinforcement means including an annular, substantially inextensible member.

9. An assembly as claimed in claim 8, wherein each said reinforcement means further includes fingers embedded within a said diaphragm and extending outwardly from a said annular member.

10. An assembly as claimed in claim 8 wherein each said annular member is a plate member surrounding a said diaphragm aperture, each said annular member having integral fingers extending radially outwardly therefrom.

11. An assembly as claimed in claim 8 wherein each said reinforcement means extends outwardly beyond an outer periphery of said clamping means for a distance at least equal to an axial separation of opposed walls of a working chamber formed between a pair of adjacent plates in said filter press.

12. An assembly as claimed in claim 8 wherein said annular clamping means comprises a pair of annular clamp halves united by fasteners.

13. An assembly as claimed in claim 12 wherein said annular clamping means is of radially outwardly facing open channel section, respective surfaces of said clamp halves adjacent each said diaphragm being rounded to reduce risk of building up local stress in said diaphragms to prevent failure thereof.

14. A filter press comprising a plurality of plates defining opposing peripheral surfaces arranged in face-to-face relationship, a corresponding plurality of working chambers defined by and between adjacent plates, each plate having a thickness and including a center feed aperture, the respective center feed apertures being in alignment and connecting successive working chambers to define a feed conduit for material to be filtered, and a plurality of resilient diaphragms, each of which is a sheet of fluid-impervious resilient material, each said diaphragm extending across one said working chamber from an interface between opposing peripheral surfaces of adjacent plates which define a working chamber to a center feed aperture of one said plate, each said diaphragm having an outer periphery and an inner periphery and having an inner surface and an outer surface, alternate ones of said plates having a continuous groove in each of said opposing peripheral surfaces which define an interface, each said groove being positioned adjacent an interface and not extending completely through said thickness of said plate, each said diaphragm including a peripheral lip extending about the entire outer periphery of the diaphragm and extending laterally outwardly from the inner surface of the diaphragm for engagement with a groove, said alternate ones of said plates defining a recess in each of the said opposing peripheral surfaces extending from the groove and in a direction toward the center feed aperture thereof, each groove, lip, diaphragm and recess being dimensioned to ensure sealing location of each diaphragm relative to the plates against fluid pressure with the opposing peripheral surfaces of adjacent plates in pressure contact to transmit press clamping forces.

15. A filter press comprising a plurality of plates defining opposing peripheral surfaces arranged in face-to-face relationship, a corresponding plurality of working chambers defined by and between adjacent plates, each plate having a thickness and including a feed aperture, a plurality of resilient diaphragms each of which is a sheet of fluid-impervious resilient material, each said diaphragm extending across one said working chamber from an interface between opposing peripheral surfaces of adjacent plates, each said diaphragm having an outer periphery and an inner periphery and having an inner surface and an outer surface, said diaphragms being in sealed relationship with respective feed apertures, alternate ones of said plates having a continuous groove in each of said opposing peripheral surfaces which define an interface, each said groove being positioned adjacent an interface and not extending completely through said thickness of said plate, each said diaphragm including a peripheral lip extending about the entire outer periphery of the diaphragm and extending laterally outwardly from the inner surface of the diaphragm for engagement with a groove, said alternate ones of said plates defining a recess in each of the said opposing peripheral surfaces extending from a position in alignment with the groove and in a direction toward the feed aperture thereof, each groove, lip, diaphragm and recess being dimensioned to ensure sealing location of each diaphragm relative to the plates against fluid pressure with the opposing peripheral surfaces in pressure contact to transmit press clamping forces.

* * * * *